United States Patent
Suzuki et al.

(10) Patent No.: US 8,330,594 B2
(45) Date of Patent: Dec. 11, 2012

(54) TIRE PRESSURE MEASURING SYSTEM AND TIRE PRESSURE MEASURING DEVICE

(75) Inventors: Hirohisa Suzuki, Ora-gun (JP); Eiji Akama, Ora-gun (JP); Kazuo Hasegawa, Ora-gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 1105 days.

(21) Appl. No.: 12/223,262

(22) PCT Filed: Jan. 24, 2007

(86) PCT No.: PCT/JP2007/051036
§ 371 (c)(1),
(2), (4) Date: Aug. 5, 2008

(87) PCT Pub. No.: WO2007/086391
PCT Pub. Date: Aug. 2, 2007

(65) Prior Publication Data
US 2009/0184815 A1    Jul. 23, 2009

(30) Foreign Application Priority Data
Jan. 30, 2006   (JP) ................. 2006-020805

(51) Int. Cl.
*B60C 23/00* (2006.01)
*B60C 23/02* (2006.01)
*B60Q 1/00* (2006.01)
*B60R 25/10* (2006.01)
*G08B 1/08* (2006.01)
*E01C 23/00* (2006.01)

(52) U.S. Cl. ............... 340/447; 340/425.5; 340/438; 340/426.33; 340/442; 340/539.1; 340/426.16; 340/449; 73/146; 73/146.2

(58) Field of Classification Search ........... 340/425.5, 340/438, 442, 445, 447, 572.1, 572.4, 572.5, 340/988, 10.1, 825.69, 825.71, 825.73, 825.31, 340/825.72, 539, 825.32, 10.5, 5.61, 5.72; 73/146.4, 146.5; 200/61.25, 61.22
See application file for complete search history.

(56) References Cited

U.S. PATENT DOCUMENTS

| | | | |
|---|---|---|---|
| 5,260,683 A | 11/1993 | Tanaka | |
| 6,062,072 A * | 5/2000 | Mock et al. | 73/146.5 |
| 2001/0008083 A1 | 7/2001 | Brown | |
| 2002/0092347 A1* | 7/2002 | Niekerk et al. | 73/146.2 |
| 2005/0033485 A1* | 2/2005 | Nimmo et al. | 701/1 |
| 2005/0078002 A1* | 4/2005 | Okubo | 340/445 |
| 2005/0163063 A1* | 7/2005 | Kuchler et al. | 370/278 |
| 2005/0285727 A1* | 12/2005 | Watabe | 340/445 |
| 2006/0176163 A1* | 8/2006 | Choi et al. | 340/444 |
| 2007/0180901 A1* | 8/2007 | Katou et al. | 73/146.2 |

FOREIGN PATENT DOCUMENTS
JP    A-04-254730    9/1992
(Continued)

*Primary Examiner* — Travis Hunnings
*Assistant Examiner* — Mirza Alam
(74) *Attorney, Agent, or Firm* — Oliff & Berridge, PLC (57) ABSTRACT

A tire pressure measuring system (TPMS) for transmitting pressure information from a tire to a vehicle body has a complicated structure when a plurality kinds of transmission data exist. A sensor unit receives a transmission electromagnetic field from a sensor control unit, and rectify-detects the received field. The counter of the sensor unit determines a rotation cycle of a tire, based on the signal obtained by the rectification detection, then switches the switch in conjunction with the rotation cycle, and sequentially sends the plurality of transmission data items for every tire rotation.

10 Claims, 3 Drawing Sheets

FOREIGN PATENT DOCUMENTS

| | | |
|---|---|---|
| JP | A-2003-507231 | 2/2003 |
| JP | A-2003-517150 | 5/2003 |
| JP | A-2004-163134 | 6/2004 |
| JP | A-2004-203165 | 7/2004 |
| JP | A-2006-007902 | 1/2006 |
| WO | WO 2006/095698 A1 | 9/2006 |

* cited by examiner

TIRE PRESSURE MEASURING SYSTEM AND TIRE PRESSURE MEASURING DEVICE

TECHNICAL FIELD

The present invention relates to a tire pressure measuring system and a tire pressure measuring device for measuring air pressure of a tire of an automobile or the like, in which a tire side sensor unit sends by radio a plurality of data items, including tire pressure, to a vehicle side control unit.

BACKGROUND ART

In the United States, a law for enforcing provision of a tire air pressure alert device mounted on an automobile has been put into effect. As a tire pressure monitoring system (TPMS), a system employing an RFID (Radio Frequency Identification) technique has been proposed. In the system, a transponder (a tire pressure detection device) having a pressure detection function and mounted on a tire communicates by radio with a reader (a control unit) mounted on a vehicle body, while utilizing the RFID technique.

Further, a TPMS for monitoring temperature of a tire, as well as the tire air pressure, has also been proposed. Conventionally, the air pressure and temperature measured by the sensor are digitally encoded by a transponder and sent to the vehicle side reader by means of an RFID technique. The digital code contains identification information for and measured values of air pressure and temperature. The reader obtains the measured air pressure and temperature values from the received digital code.

DISCLOSURE OF THE INVENTION

Problems to be Solved by the Invention

In the above, however, there is a problem that the transponder has a complicated circuit structure and larger power consumption can result because a plurality of transmission data items are combined into one signal or converted into one digitally coded bit string in the transponder. The reader has similar problems, such as a complicated structure and so forth.

Means for Solving the Problems

According to one aspect of the present invention, there is provided a tire pressure measuring system in which a control unit mounted on a vehicle body is connected by radio to a sensor unit mounted on a tire of the vehicle body, for transmitting air pressure inside the tire, measured by the sensor unit, to the control unit, wherein the control unit comprises an electromagnetic field generation circuit for generating a transmission electromagnetic field varying at a predetermined transmission frequency, and a data receiving circuit for detecting transmission data from the sensor unit, based on variation of the transmission electromagnetic field, the variation caused due to the sensor unit; the sensor unit comprises an antenna for receiving the transmission electromagnetic field, and through mutual reaction with the transmission electromagnetic field, affecting the transmission electromagnetic field such that the transmission electromagnetic field varies, to thereby communicate with the control unit, and a data transmission circuit for changing an antenna current flowing in the antenna to thereby cause the transmission electromagnetic field to vary, and alternately transmitting a plurality kinds of transmission data, including the air pressure; and the data transmission circuit detects a rotation cycle of the tire, based on change of strength with which the transmission electromagnetic field is received, and carries out a transmission operation while switching the kinds of transmission data in conjunction with the rotation cycle.

According to the present invention, the sensor unit determines the rotation cycle of the tire, based on the change of strength with which the transmission electromagnetic field is received, and carries out transmission operation while switching the kinds of transmission data in conjunction with the rotation cycle. With the above, signal combination and conversion into one digital code are unnecessary.

In the above described tire pressure measuring system, the data transmission circuit may include a detector circuit for rectifying-detecting the variation of the transmission electromagnetic field in accordance with the transmission frequency, and a rotation detection circuit for detecting one rotation of the tire, based on change of an output level of the detector circuit between when the sensor unit carries out communication with the control unit and when the sensor unit does not.

In the above described tire pressure measuring system, the data transmission circuit may include a storage unit for storing information specifying the kind of transmission data to be next transmitted, and a power supply unit for storing power obtained from the transmission electromagnetic field, and supplying operating power to the storage unit continuously over a plurality of rotation cycles to thereby enable storage of the information.

Further, in the above described tire pressure measuring system, the sensor unit may include a temperature sensor for measuring temperature inside the tire, and the transmission data may include the temperature, in addition to the air pressure.

According to another aspect of the present invention, there is provided a tire pressure measuring device, comprising an antenna for mutually reacting with a supply electromagnetic field given from outside to thereby cause the supply electromagnetic field to change in amplitude, and a data transmission circuit for changing an antenna current flowing in the antenna to thereby change the amplitude of the supply electromagnetic field, and alternately transmitting to the outside a plurality kinds of transmission data including air pressure, wherein the data transmission circuit may detect a rotation cycle of a tire, based on change of strength with which the supply electromagnetic field is received, and carry out a transmission operation while switching the kinds of transmission data in conjunction with the rotation cycle.

In the above described tire pressure measuring device, the data transmission circuit may include a detector circuit for rectifying-detecting variation of the supply electromagnetic field in accordance with frequency, and a rotation detection circuit for detecting one rotation of the tire, based on change of an output level of the detector circuit.

In the above described tire pressure measuring device, the data transmission circuit may include a storage unit for storing information specifying the kind of transmission data to be next transmitted, and a power supply unit for storing power obtained from the transmission electromagnetic field, and supplying operating power to the storage unit continuously over a plurality of rotation cycles to thereby enable storage of the information.

Further, the above described tire pressure measuring device may further comprise a temperature sensor for measuring temperature inside the tire, wherein the transmission data may include the temperature, in addition to the air pressure.

Effects of the Invention

According to the present invention, neither combining transmission data into one signal nor conversion into one digitally encoded bit string are necessary. This can simplify the structures of the sensor unit and control unit. In particular, a simplified structure of the sensor unit can lead to suppression of power consumption.

BRIEF DESCRIPTION OF THE DRAWINGS

FIG. 1 is a schematic diagram showing a simplified structure of a tire pressure measuring system for measuring tire pressure of a vehicle, such as an automobile or the like;

BEST MODE FOR CARRYING OUT THE INVENTION

In the following, an embodiment of the present invention (hereinafter referred to as an embodiment) will be described based on the accompanying drawings.

Figure 1:
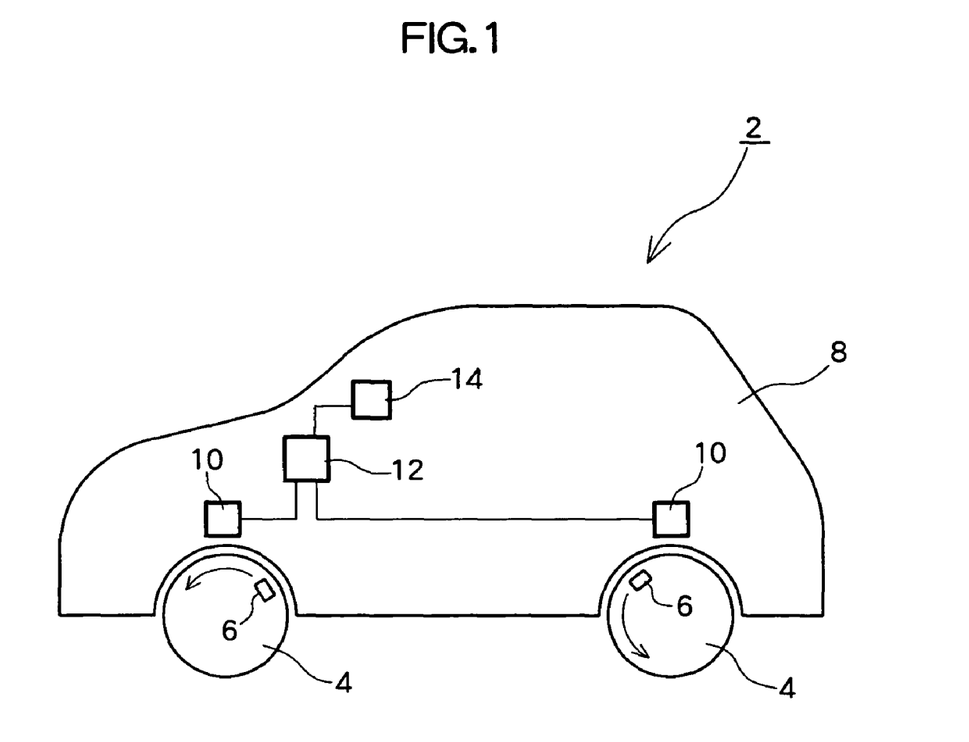

FIG. 1 is a schematic diagram showing a structure of a tire pressure measuring system for measuring air pressure of a tire of a vehicle, such as an automobile or the like. This system comprises a sensor unit 6, or a transponder mounted on each tire 4 of an automobile 2, and a sensor control unit 10, or a reader mounted on the vehicle body 8 in the vicinity of the tire 4. The sensor unit 6 is connected wirelessly to the sensor control unit 10 via, e.g., a 13.56 MHz electromagnetic field sent from the sensor control unit 10, using an inductive coupling method. Notably, the wireless connection between the sensor unit 6 and sensor control unit 10 can be realized using any other frequency used in the RFID technique, or any other coupling method.

The sensor unit 6 mounted on the tire, containing no battery, operates utilizing a driving power converted from an electromagnetic field from the sensor control unit 10, and specifically, measures air pressure and temperature inside the tire and sends data about the measured result. Meanwhile, the sensor control unit 10 detects the data sent from the sensor unit 6, and notifies the vehicle control unit 12, such as, e.g., an ECU or the like, of the data. The vehicle control unit 12 detects an abnormal state of the tire, based on, e.g., the pressure and temperature information about the tire, and controls vehicle travel or displays the measured pressure and temperature on the display device 14 to notify the driver.

Figure 2:
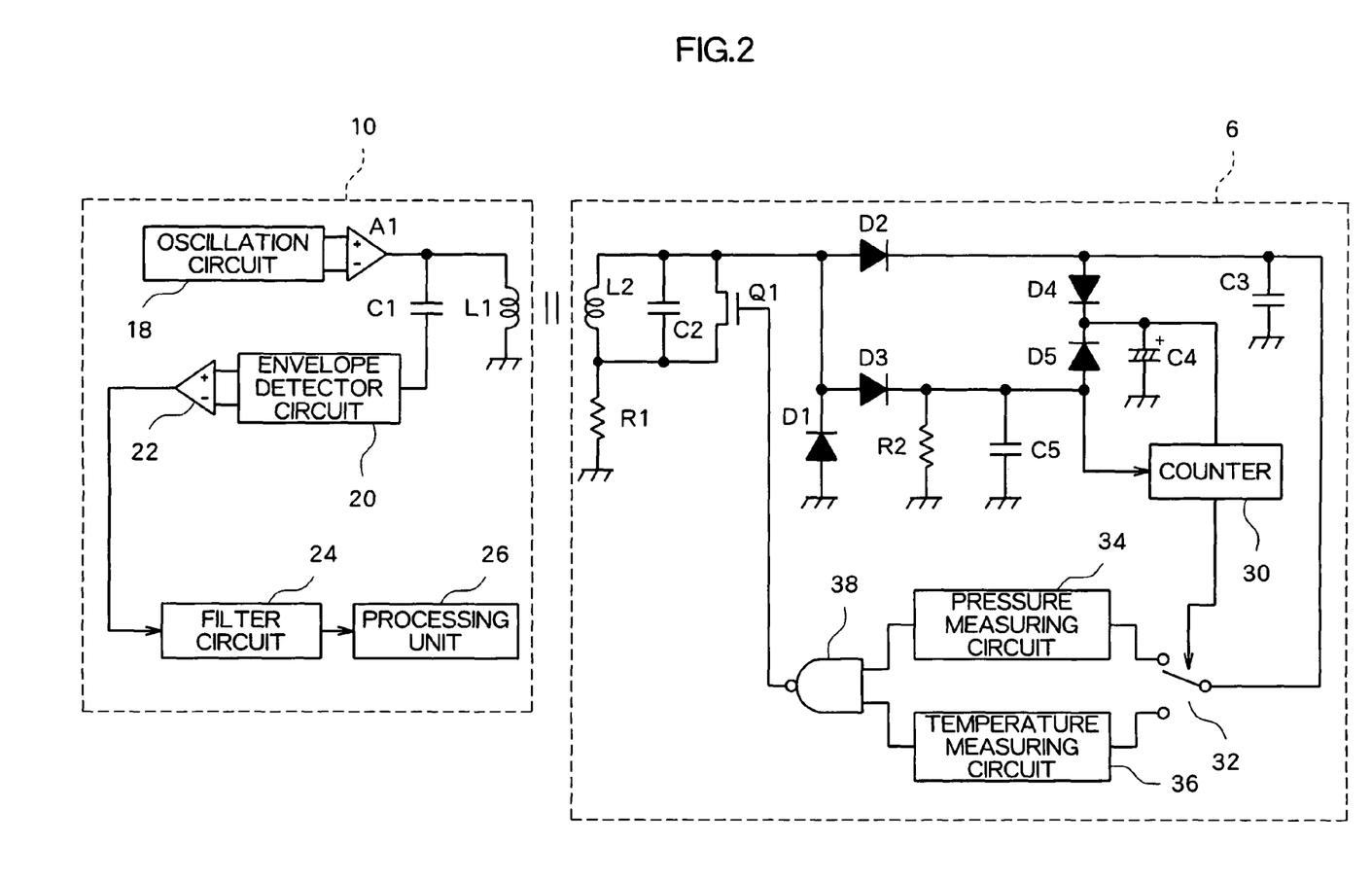
FIG. 2 is a schematic circuit diagram showing a sensor unit and a sensor control unit according to an embodiment of the present invention.

FIG. 2 is a schematic circuit diagram of the sensor unit 6 and the sensor control unit 10. The sensor control unit 10 includes an electromagnetic field generation circuit and a data receiving circuit, specifically, comprising an oscillation circuit 18, a driver A1, a coil L1, an envelope detector circuit 20, a waveform shaping circuit 22, a filter circuit 24, and a processing unit 26.

The electromagnetic field generation circuit comprises the oscillation circuit 18, the driver A1, and the coil L1. The oscillation circuit 18 produces a clock at a frequency f0, and supplies this clock to the driver A1, which is connected at an output terminal thereof to one terminal of the coil L1, whose other terminal is grounded. In response to a clock at the frequency f0, received at the input terminal from the oscillation circuit 18, the driver A1 sends an AC current at the frequency f0 to the coil L1. In response to the AC current received, the coil L1 generates a transmission electromagnetic field varying at a transmission frequency f0.

Meanwhile, the data receiving circuit includes the envelope detector circuit 20, the waveform shaping circuit 22, the filter circuit 24, and the processing unit 26. The data receiving circuit has a function for obtaining transmission data from the sensor unit 6, based on the frequency of variation of the transmission electromagnetic field, the variation caused due to operation of the sensor unit 6, to be described later. Details of the function will be described later, after description of the sensor unit 6.

The sensor unit 6 has as an antenna which is a parallel LC resonant circuit comprising a coil L2 and a capacitor C2, and is connected wirelessly to the sensor control unit 10 via the electromagnetic field formed between the coil L2 and the coil L1. For example, this system utilizes the phenomenon in which the coil L1 and the coil L2, when getting closer to each other, are placed in a transformer coupling state by means of electromagnetic induction. With the electromagnetic field varying at the frequency f0 due to the coil L1 on the sensor control unit 10 side, as described above, an AC voltage at the frequency f0 is generated between both ends of the coil L2 subjected to transformer coupling.

Notably, the capacitance of the capacitor C2 is determined such that the parallel LC resonant circuit has resonance frequency f0. With the thus structured LC resonant circuit, the coil L2 can generate resonance phenomena in response to a component having the frequency f0, generated by the sensor control unit 10, in the external AC magnetic field, to thereby amplify the voltage amplitude of the AC signal generated between both ends of the coil L2. One terminal of the coil L2 is grounded via, e.g., resistance R1, while the other terminal thereof is connected to a response circuit having functions for detection, power generation, pressure and temperature measurement, data transmission, and so forth. A transistor Q1, to be described later, is connected between both ends of the coil L2.

The other terminal of the coil L2 is connected to the anodes of the diodes D2 and D3, and also to the cathode of the diode D1, whose anode is grounded. As the sensor unit 6 contains no battery, the power needed by the sensor unit 6 is generated by the diode D2 by rectifying-detecting an AC current generated in the coil L2 due to the transmission electromagnetic field from the sensor control unit 10. Using the DC current obtained through the rectification by the diode D2, the capacitor C3 is charged. The capacitor C3 supplies the power charged therein, as general power supply (system power supply) of the sensor unit 6.

The diode D4 is connected to the cathode of the diode D2 in the forward direction. The cathode of the diode D4 is connected to one terminal of the capacitor C4, whose other terminal is grounded. The capacitor C4, constituting a power supply of the counter 30, is charged by the DC current obtained by rectifying the current from the coil L2, similar to the capacitor C3, and supplies operating power to the counter 30. That is, the capacitor C4 is formed using a capacitor, such as, e.g., an electrolytic capacitor, having large capacitance, and smoothes the variation of the current from the coil L2 due to the rotating tire 4, and supplies operating power to the counter 30 continuously over two or more rotation cycles of the tire 4. With the above, the counter 30 can retain a count state, despite variation of the strength with which the transmission electromagnetic field is received due to the rotating tire 4. Note that the capacitance of the capacitor C4 can be set such that the electric power at a predetermined or larger voltage is maintained in a tire rotation cycle at a vehicle speed which requires tire state monitoring.

Similar to the diode D2, the diode D3 operates as a detector circuit for rectifying-detecting an AC current in accordance with the transmission frequency of the transmission electromagnetic field. The cathode of the diode D3 is connected to one terminal of each of the resistance R2 and capacitor C5, whose other ends are grounded, respectively. The resistance R2 and capacitor C5 constitute a low pass filter, with charging by the capacitor C5 and discharging by the resistance R2. An output from the low pass filter makes an input to the counter 30.

As this system handles two kinds of data, namely, pressure and temperature, to be switched and transmitted, the counter 30 is formed capable of selectively taking two states. That is, the counter 30 of this system alternately takes two count states in conjunction with the count operation. Thus, in this case, the counter 30 can be formed using a latch circuit. The counter 30 produces a control signal for the switch 32, based on the count state thereof, and alternately switches the switch 32, which selectively causes the pressure measuring circuit 34 or the temperature measuring circuit 36 to operate. For example, the switch 32 can switch system power supply to the pressure measuring circuit 34 and temperature measuring circuit 36.

The pressure measuring circuit 34 has a pressure sensor for measuring air pressure inside a tire, and outputs an oscillation signal at a frequency fp in accordance with the value measured by the pressure sensor. The temperature measuring circuit 36 has a temperature sensor for measuring temperature inside a tire, and outputs an oscillation signal at a frequency ft in accordance with the value measured by the temperature sensor. In the above, the band (central frequency f1 and width ±Δf1) of an output frequency of the pressure measuring circuit 34 differs from that (central frequency f2 and width ±Δf2) of an output frequency of the temperature measuring circuit 36, both set separate from each other. As output oscillation signals from the pressure measuring circuit 34 and temperature measuring circuit 36 serve as amplitude modification signals with respect to the transmission electromagnetic field at the frequency f0, it is preferable that f1, f2<<f0 is held. Suppose that the frequency f0 is set as 13.56 MHz, as described above, by way of an example, the frequencies f1 and f2 can be set at 300 kHz and 150 kHz, respectively. With Δf1+Δf2<|f1−f2| set, two bands are separated.

For example, the pressure sensor is a capacitance type pressure sensor, or a sensor element for changing electric capacitance Cp, among electrical attributes such as R, C, L, according to the pressure P. The pressure measuring circuit 34 has an LC oscillation circuit formed by combining the capacitance Cp of the pressure sensor and the coil Lp, for generating an oscillation signal at a frequency fp which varies according to change of the pressure P. Meanwhile, the temperature sensor is, e.g., a resistive temperature sensor, or a sensor element for changing electrical resistance Rt, among the electrical attributes, according to the temperature T. The temperature measuring circuit 36 has a CR oscillation circuit formed by combining the resistance Rt of the temperature sensor and the capacitance Ct, for generating an oscillation signal at a frequency ft which varies according to change of the temperature T.

Outputs from the pressure measuring circuit 34 and temperature measuring circuit 36 constitute input signals to the NAND gate 38. The detection circuits 34, 36, when operating, each output to the NAND gate 38 an oscillation signal being switched between the logical "H (high)" and "L (low)" levels according to the oscillation frequency thereof. Meanwhile, the detection circuits 34, 36, when not operating, each output an H level signal to the NAND gate 38. With the above, the NAND gate 38 outputs a clock at the same frequency as that of an oscillation signal from the detection circuit which is operating.

An output from the NAND gate 38 is applied to the gate of the transistor Q1. For example, the transistor Q1 becomes an ON state when receiving an H level output from the NAND gate 38, and an OFF state when receiving an L level output. With this structure, the impedance of the coil L2 becomes smaller when the transistor Q1 is in the ON state than in the OFF state.

With the coil L2 impedance changed, the electromagnetic field coupling the coils L1, L2 varies. As a result, a transmission load of the transmission circuit of the above described electromagnetic field of the sensor control unit 10 is changed. That is, the sensor unit 6 affects the transmission electromagnetic field of the sensor control unit 10 such that the transmission electromagnetic field fluctuates at a frequency according to the pressure and temperature, or transmission data, and the sensor control unit 10 obtains transmission data from the sensor unit 6 from the fluctuation received by the coil L1 of the sensor control unit 10.

The data receiving circuit in the sensor control unit 10 is a circuit for obtaining transmission data from the sensor unit 6. The data receiving circuit is connected to the output terminal of the driver A1 via the capacitor C1 for DC cutting. The envelope detector circuit 20 of the data receiving circuit detects fluctuation of the amplitude of an AC current at the output terminal of the driver A1, the fluctuation due to change of the transmission load, and extracts an amplitude modulation signal in accordance with the amplitude fluctuation. The extracted amplitude modulation signal at the frequency f1 or f2 is subjected to waveform shaping in the waveform shaping circuit 22, and then input to the filter circuit 24.

The filter circuit 24 obtains the frequency of the amplitude modulation signal input thereinto. For example, the filter circuit 24 can be constructed using, e.g., a digital filter circuit, and incorporate a frequency counter as a part thereof. The frequency counter outputs the frequency of the amplitude modulation signal to the processing unit 26.

The processing unit 26 holds beforehand a correspondence table showing correspondence between frequency, and pressure and temperature, and determines the kind of transmission data, that is, whether pressure or temperature, based on the frequency input, with reference to the table. Further, the processing unit 26 converts the frequency into a measured pressure or temperature value, to thereby reproduce the transmission data. The processing unit 26 outputs the thus obtained pressure or temperature to the vehicle control unit 12.

Figure 3:
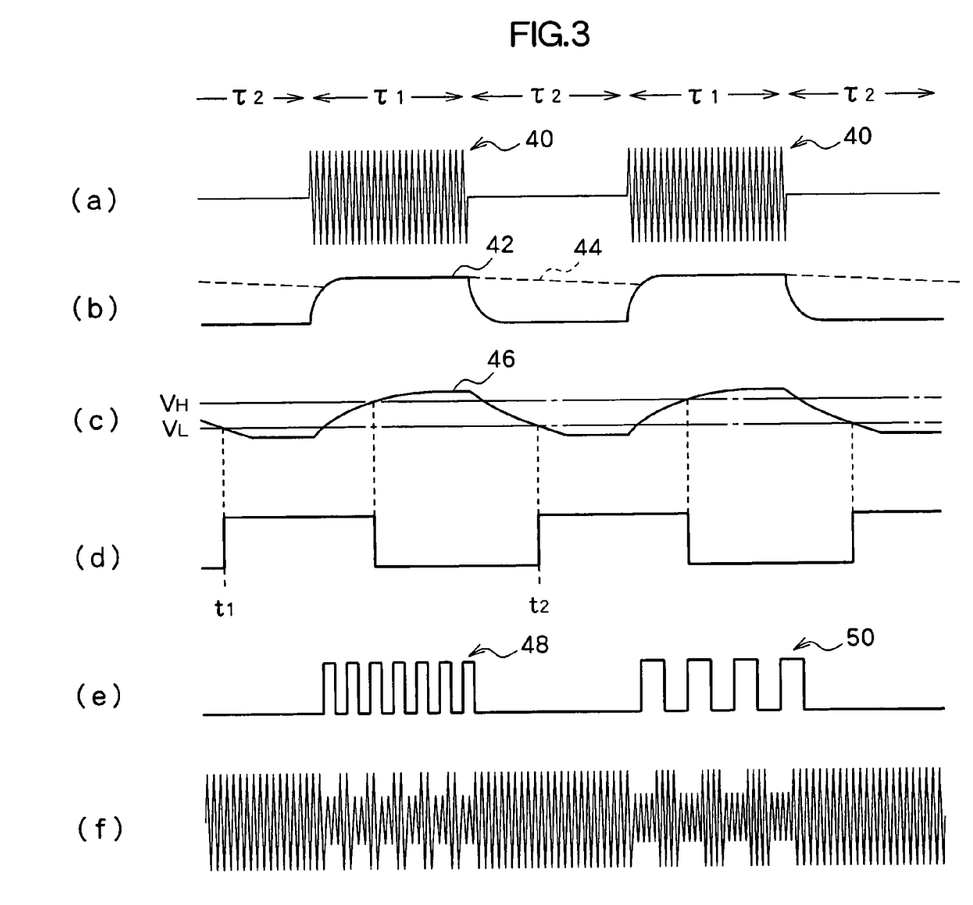
FIG. 3 is a schematic signal waveform diagram for explaining an operation of a system according to the embodiment of the present invention.

In the following, an operation of this system will be described in further detail. FIG. 3 is a schematic diagram showing signal waveforms for explaining an operation of this system. Although the sensor control unit 10 continuously forms a transmission electromagnetic field, transmission between the sensor control unit 10 and the sensor unit 6 via the transmission electromagnetic field while the vehicle is traveling is intermittent as the distance between the sensor control unit 10 and the sensor unit 6 periodically changes due to the rotating tire. FIG. 3(a) shows a waveform of a transmission electromagnetic field detected by the antenna of the sensor unit 6. According to FIG. 3(a), a transmission electromagnetic field is detected and a waveform 40 varying at the frequency f0 in accordance with the detected transmission electromagnetic field is output only during the period τ1, with the antenna of the sensor unit 6 staying close to the sensor control unit 10, and no transmission electromagnetic field is detected during the period τ2, with the antenna of the sensor unit 6 being away from the sensor control unit 10. Notably, τ1+τ2 corresponds to one tire rotation.

FIG. 3(b) shows a waveform representing variation of a power supply voltage produced based on the transmission electromagnetic field detected by the sensor unit 6. According to FIG. 3(b), the solid line waveform 42 represents voltage variation of the system power supplied from the capacitor C3. That is, charging the capacitor C3 begins and the system power supply voltage thus rises as detection of the transmission electromagnetic field begins (beginning of the period τ1), and discharging the capacitor C3 begins and the system power supply voltage thus falls as detection of the transmission electromagnetic field ends (end of the period τ1). The counter 30 is formed using a latch circuit or the like which uses a CMOS transistor or the like, and switches the switch 32 from the present state to another state for every tire rotation. In the above, upon fall of the power supply voltage, the present state held by the counter is reset. This makes appropriate switching of the switch 32 in the following tire rotation cycle not readily attainable. In view of the above, in this system, a large capacitance capacitor C4 is provided as power supply for the counter 30, so that the voltage of the capacitor C4 can be maintained high during the period τ1, similar to the capacitor C3, and rarely falls during the subsequent period τ2 from the high voltage marked during the period τ1, as indicated by the dotted line 44 in FIG. 3(b). As a result, a sufficient voltage necessary for operation of the counter 30 can be ensured, and the counter 30 can hold the state set beforehand also during the period τ2, thus being of appropriate switching of the switch 32 in the following rotation cycle. For example, suppose that the counter 30 sets such that the switch 32 is connected to the pressure measuring circuit 34 during a certain rotation cycle so that pressure information is sent as transmission data. In this case, either a count state indicating that the present transmission data is pressure information or a count state indicating that data to be next transmitted is temperature information may be held during the period τ2 as information specifying the kind of transmission data to be next transmitted.

FIG. 3(c) shows a waveform of an input signal to the counter 30. The waveform 46 of the input signal varies for every tire rotation, similar to the waveform 42 of the system power supply, though the time constant for rise and fall of the waveform 46 is larger due to charge and discharge operation by the resistance R2 and capacitor C5, compared to that of the waveform 42. FIG. 3(d) shows a waveform of an output from the comparator inside the counter 30 with respect to an input signal. The comparator provided at the input of the counter 30 alternately outputs a signal at either the H or L level in synchronism with the waveform 46 periodically varying according to the tire rotation. For example, the comparator switches the output level to the L level in response to the waveform 46 exceeding a predetermined threshold VH, as shown in FIG. 3(d), and to the H level in response to the waveform 46 diving a predetermined threshold VL. That is, the counter 30 operates as a rotation detection circuit for detecting one tire rotation, based on the change of the input signal level between the period τ1, with the sensor control unit 10 in communication with the sensor unit 6, and the period τ2, with the sensor control unit 10 not.

The counter 30 switches the count states in synchronism with a timing at which, e.g., a comparator output rises from the L to H level. For example, in the case where the counter 30 holds a count state indicating that that the transmission data is temperature information during the period τ1 before the time t1 at which a comparator output rises, the counter 30 switches the count states from the present one to another one indicating that the next transmission data is pressure information in conjunction with rise of an output from the comparator at time t1. Likewise, at the rise timing t2, the counter switches the count state to one indicating that the next transmission data is temperature information. Although these switching timings are within the period τ2, during which the system power supply remains off, the counter 30 can carry out the switching operation as powered by the capacitor C4, as described above, to store and hold the state thereof.

The counter 30 switches the switch 32 according to the count state. For example, the switch 32 is switched at time t1 such that the system power supply is connected to the pressure measuring circuit 34, and at time t2 to the temperature measuring circuit 36. As described above, the sensor unit 6 detects a tire rotation cycle, based on the change of strength with which to receive the transmission electromagnetic field, and switches the kinds of transmission data in conjunction with the rotation cycle.

FIG. 3(e) shows a waveform of an oscillation signal from the NAND gate 38. The pressure measuring circuit 34, brought into connection to the system power supply at time t1, begins oscillation operation as the sensor unit 6 approaches the sensor control unit 10 while the tire rotates, and the system power supply thus rises, and then produces a clock 48 at a frequency fp in accordance with the detected pressure within a band having the central frequency f1. As the sensor unit 6 moves farther from the sensor control unit 10 as the tire rotates and the system power supply thus stops, the clock 48 stops as well. Likewise, the temperature measuring circuit 36, brought into connection to the system power supply at time t2, continues the oscillation operation while the system power supply remains supplied, producing a clock 50 at a frequency ft in accordance with the detected temperature within a band having the central frequency f2. With the above, the NAND gate 38 alternately outputs a clock 48 at a frequency fp and a clock 50 at a frequency ft for every tire rotation, so that the transistor Q1 is turned on/off under control by the output from the NAND gate 38. As a result, the impedance of the coil L2 is changed, causing a change in the strength of the electromagnetic field with which the coils L1 and L2 are coupled. That is, the amplitude of the transmission electromagnetic field from the sensor control unit 10 is modulated, using a signal from the NAND gate 38, shown in FIG. 3(e), as an amplitude modulation signal. FIG. 3(f) shows a waveform representing a transmission electromagnetic field subjected to the amplitude modulation.

The envelope detector circuit 20 of the sensor control unit 10 detects and extracts an amplitude modulation signal, shown in FIG. 3 (e), from the variation of the transmission electromagnetic field, shown in FIG. 3(f). The filter circuit 24 obtains the frequencies of the clock waveforms 48, 50 intermittently and alternately appearing in the amplitude modulation signal from the envelope detector circuit 20, and outputs to the processing unit 26. The processing unit 26 obtains the kind and value of the transmission data, with reference to the correspondence table concerning frequency and transmission data.

Notably, although two kinds of transmission data, namely, pressure and temperature, are mentioned in the above-described structure, three or more kinds of transmission data may be applicable. In such a structure, the counter can selectively take the states in accordance with the number of kinds of transmission data, and for example, sequentially and cyclically switches the count states in conjunction with the count operation, and the switch switches the three or more detection circuits in conjunction with an output from the counter.

Although a count state corresponding to the kind of next transmission data is set in the counter 30 during the period τ2 in the above described structure, the counter 20 can be formed so as to hold, during the period τ2, a count state corresponding to the kind of transmission data having been sent during the immediately preceding period τ1 so that the kind of transmission data is switched during the subsequent period τ1. In this case, the counter 30 switches the states in conjunction with fall of an output from the comparator, shown in FIG. 3(d), to thereby switch the switch 32. Then, an oscillation signal from the pressure measuring circuit 34 or temperature measuring circuit 36 is supplied to the transistor Q1 after the switch is switched in the midst of each period τ1 and before the period τ1 ends, upon which the system power supply is stopped.

The invention claimed is:

1. A tire pressure measuring system in which a control unit mounted on a vehicle body is connected by radio to a sensor unit mounted on a tire of the vehicle body, for transmitting data regarding at least air pressure and temperature of the tire, measured by the sensor unit, to the control unit, wherein the control unit comprises
an electromagnetic field generation circuit for generating a transmission electromagnetic field varying at a predetermined transmission frequency, and
a data receiving circuit for detecting transmission data from the sensor unit, based on variation of the transmission electromagnetic field, the variation caused due to the sensor unit, the sensor unit comprises
a plurality of kinds of sensors including at least a pressure sensor for measuring the air pressure and a temperature sensor for measuring temperature,
an antenna for receiving the transmission electromagnetic field, and through interaction with the transmission electromagnetic field, affecting the transmission electromagnetic field such that the transmission electromagnetic field varies, to thereby communicate with the control unit, and
a data transmission circuit for changing an antenna current flowing in the antenna to thereby cause the transmission electromagnetic field to vary, and alternately transmitting a plurality of kinds of transmission data corresponding to output of the plurality of kinds of sensors, the kinds of transmission data including at least pressure data and temperature data, and the data transmission circuit detects a rotation cycle of the tire, based on change of strength with which the transmission electromagnetic field is received, and carries out a transmission operation while switching among the kinds of transmission data in synchronism with the rotation cycle.

2. The tire pressure measuring system according to claim 1, wherein
the data transmission circuit includes
a detector circuit for rectifying-detecting the variation of the transmission electromagnetic field in accordance with the transmission frequency, and
a rotation detection circuit for detecting one rotation of the tire, based on change of an output level of the detector circuit between when the sensor unit carries out communication with the control unit and when the sensor unit does not.

3. The tire pressure measuring system according to claim 1, wherein
the data transmission circuit includes
a storage unit for storing information specifying the kind of transmission data to be next transmitted, and
a power supply unit for storing power obtained from the transmission electromagnetic field, and supplying operating power to the storage unit continuously over a plurality of the rotation cycles to thereby enable storage of the information.

4. A tire pressure measuring device, comprising:
a plurality of kinds of sensors including at least a pressure sensor for measuring air pressure inside a tire and a temperature sensor for measuring temperature,
an antenna for interaction with a supply electromagnetic field given from outside to thereby cause the supply electromagnetic field to change in amplitude, and
a data transmission circuit for changing an antenna current flowing in the antenna to thereby change the amplitude of the supply electromagnetic field, and alternately transmitting to the outside a plurality of kinds of transmission data corresponding to output of the plurality of kinds of sensors, the kinds of transmission data including at least pressure data and temperature data, wherein
the data transmission circuit detects a rotation cycle of a tire, based on change of strength with which to receive the supply electromagnetic field, and carries out a transmission operation while switching among the kinds of transmission data in synchronism with the rotation cycle.

5. The tire pressure measuring device according to claim 4, wherein
the data transmission circuit includes
a detector circuit for rectifying-detecting variation of the supply electromagnetic field in accordance with frequency of the supply electromagnetic field,
a rotation detection circuit for detecting one rotation of the tire, based on change of an output level of the detector circuit.

6. The tire pressure measuring device according to claim 4, wherein
the data transmission circuit includes
a storage unit for storing information specifying the kind of transmission data to be next transmitted, and
a power supply unit for storing power obtained from the supply electromagnetic field, and supplying operating power to the storage unit continuously over a plurality of the rotation cycles to thereby enable storage of the information.

7. The tire pressure measuring system according to claim 2, wherein
the data transmission circuit includes
a storage unit for storing information specifying the kind of transmission data to be next transmitted, and
a power supply unit for storing power obtained from the transmission electromagnetic field, and supplying operating power to the storage unit continuously over a plurality of the rotation cycles to thereby enable storage of the information.

8. The tire pressure measuring device according to claim 5, wherein
the data transmission circuit includes
a storage unit for storing information specifying the kind of transmission data to be next transmitted, and
a power supply unit for storing power obtained from the supply electromagnetic field, and supplying operating power to the storage unit continuously over a plurality of the rotation cycles to thereby enable storage of the information.

9. The tire pressure measuring system according to claim 1, wherein the data transmission circuit includes a switch circuit for selectively causing the plurality of kinds of sensors to operate in conjunction with the rotation cycle of the tire.

10. The tire pressure measuring device according to claim 4, wherein the data transmission circuit includes a switch circuit for selectively causing the plurality of kinds of sensors to operate in conjunction with the rotation cycle of the tire.

* * * * *